United States Patent [19]
Edwards

[11] 3,968,649
[45] July 13, 1976

[54] EXHAUST EMISSION CONTROL SYSTEM
[75] Inventor: Thomas C. Edwards, Casselberry, Fla.
[73] Assignee: The Rovac Corporation, Maitland, Fla.
[22] Filed: Apr. 15, 1974
[21] Appl. No.: 460,700

Related U.S. Application Data
[63] Continuation-in-part of Ser. No. 417,888, Nov. 21, 1973, abandoned.

[52] U.S. Cl. ............................... 60/297; 23/288 F; 55/DIG. 30; 60/298; 60/309; 60/315; 60/320; 55/269; 62/123; 62/402
[51] Int. Cl.² ......................................... B01D 50/00
[58] Field of Search ............... 55/DIG. 30, 267–269; 60/297, 298, 320, 309, 315, 302; 23/288 F; 62/123, 402

[56] References Cited
UNITED STATES PATENTS

| | | |
|---|---|---|
| 2,966,036 | 12/1960 | Stowens ................................ 62/11 |
| 3,082,597 | 3/1963 | Hamblin ............................ 23/288 F |
| 3,389,972 | 6/1968 | Pottharst Jr. ......................... 23/281 |
| 3,683,626 | 8/1972 | Merrill ................................. 60/310 |
| 3,686,893 | 8/1972 | Edwards .............................. 62/402 |

Primary Examiner—Bernard Nozick
Attorney, Agent, or Firm—Leydig, Voit, Osann, Mayer & Holt, Ltd.

[57] ABSTRACT

An emission control system for an internal combustion engine cools the exhaust gases sufficiently to condense a substantial portion of the pollutants as a separable liquid or solid phase. The engine exhaust gases are initially cooled and then compressed, again cooled, and work-expanded in an open reversed Brayton cycle to obtain a significant temperature decrease. The resulting cooled gases from this the pollutants are readily separated may be employed to provide refrigeration or air-conditioning for moving vehicles.

4 Claims, 2 Drawing Figures

EXHAUST EMISSION CONTROL SYSTEM

CROSS REFERENCE TO RELATED APPLICATION

This is a continuation-in-part of application Ser. No. 417,888, filed Nov. 21, 1973 now abandoned.

BACKGROUND OF THE INVENTION

This invention relates to pollution control systems, and more particularly provides an emission control system for an internal combustion engine. While not so limited, the invention is particularly applicable to automotive and other moving vehicle engines, where the low temperatures obtained as an adjunct may be employed to air-condition or refrigerate part of the vehicle.

The intensified search for improved emission control systems for internal combustion engine has spawned a multitude of proposals. At present, three basic systems have emerged: catalytic treatment of the exhaust gases, after-burners to complete the combustion of exhaust gases, and modification of the engine operating parameters to minimize the amount of emission. Catalysts, however, are readily contaminated by lead compounds in the gases; after-burners require additional fuel; and alteration of operating parameters (e.g. compression ratio, spark timing, etc.) has caused deterioration in gas mileage.

Accordingly, an object of the invention is to provide an emission control system for internal combustion engines which system requires no lead-susceptible catalysts, no fuel-consuming after-burning, and no alteration of the engine itself. An additional object is to provide such system in a form which is particularly applicable to moving vehicles, especially passenger cars, which are driven under a variety of traffic and atmospheric conditions.

Further, an important object of the invention is to provide an emission control system for vehicles, which system produces a low-temperature effluent that can be utilized for air-conditioning or for refrigeration purposes. Thus, as a result of this feature, the installation of an emission control system in an automobile or truck, with little further investment or operating cost, provides the vehicle with a self-contained air conditioning system.

Still other and further objects include the provision of a low cost, durable, and essentially trouble-free emission control system; an emission control system which permits ready withdrawal and disposal of concentrated pollutants; a system which requires no periodic replacement of catalyst inventory; a system which actually enhances the combustion efficiency of an internal combustion engine by reducing the exhaust back-pressure; and a system which permits ready manual or automatic adjustment of flows to optimize engine operation, pollution elimination, and/or refrigeration, depending upon the local demands of temperature, traffic, and legal conditions.

SUMMARY OF THE INVENTION

Briefly, in accordance with the invention, a system is provided for controlling emissions from an internal combustion engine by initially cooling the exhaust gases from such engine, then compressing, again cooling, and work-expanding the exhaust gases to further cool them to a temperature sufficient to condense a substantial portion of the pollutants as a separable liquid or solid phase, and thereafter separating the pollutants-containing phase from the remaining exhaust gases. Thus, pollutants are removed from the exhaust gases by cooling the gases to a temperature sufficiently low so that the pollutants condense out, and the cleaned exhaust gases are discharged to the atmosphere.

The system of the invention is particularly suitable for utilizing a unitary rotary compressor-expander, of the type described in U.S. Pat. No. 3,686,893, as a device for both adiabatically compressing the exhaust gases and for work-expanding the cooled compressed exhaust gases. With such a rotary compressor-expander, thermodynamic efficiency is maintained at a high level, while investment, operating, and maintenance costs are retained sufficiently low as to be suitable for passenger automobiles.

A particularly advantageous feature of the invention is that, with minor modification, it provides refrigeration or air conditioning as well as pollution control. Thus, with little additional equipment—and no conventional auxiliaries such as extra compressors, refrigeration fluids, or the like—a cool or cold air stream can be provided for passenger air conditioning or for vehicle refrigeration.

BRIEF DESCRIPTION OF THE DRAWINGS

Other objects and advantages of the invention will become apparent from the following detailed description and upon reference to the drawings, in which.

Figure 1:
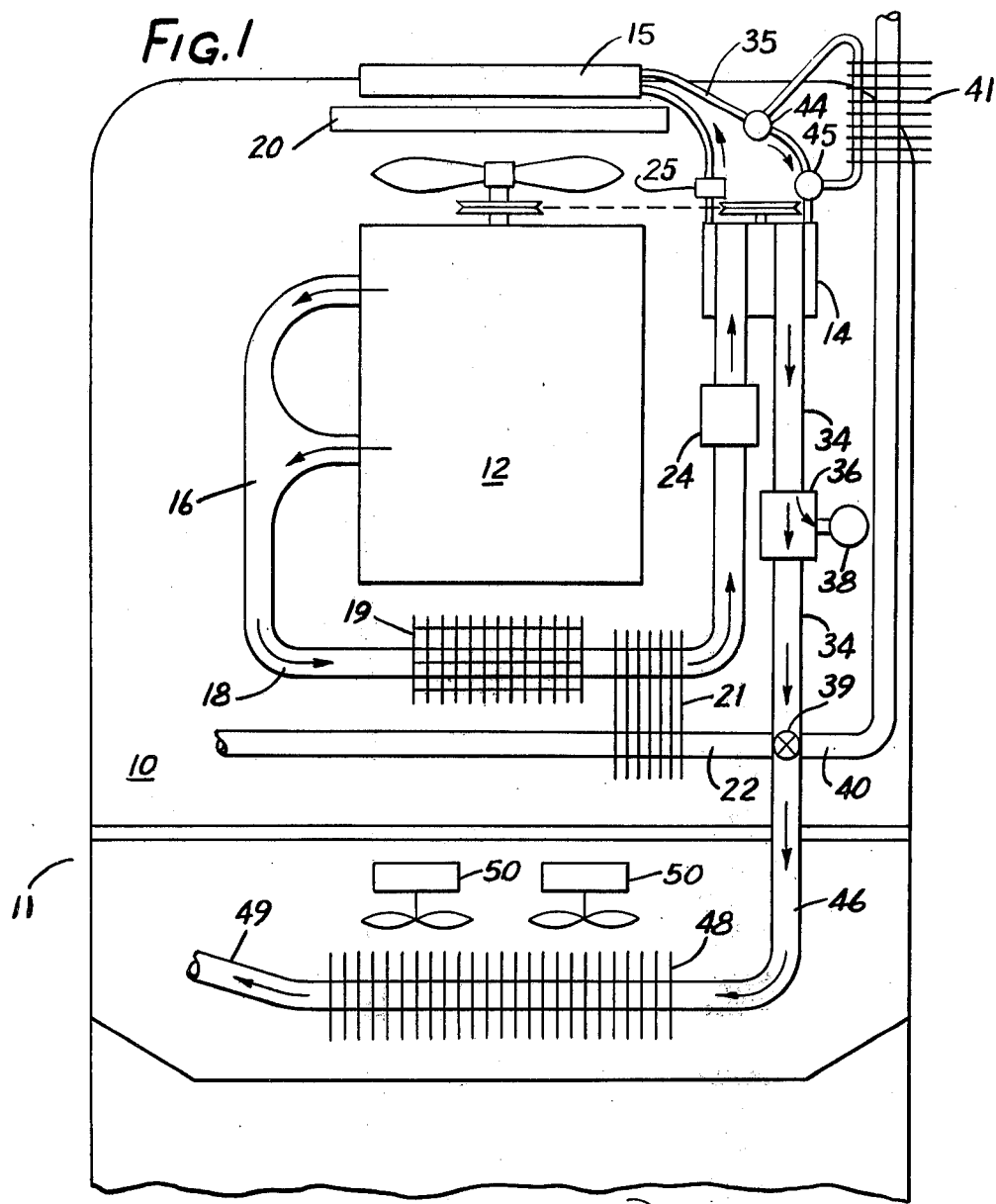
FIG. 1 is a generalized schematic top view of an automobile engine compartment, in which the inventive system is employed in alternative arrangements for maximizing either pollution control or refrigeration and air conditioning.

While the invention will be described in connection with a preferred embodiment as illustrated in the drawings, it will be understood that it is not intended to limit the invention to that embodiment. On the contrary, it is intended to cover all alternatives, modifications, and equivalents as may be included within the spirit and scope of the invention as defined by the appended claims.

DESCRIPTION OF THE PREFERRED EMBODIMENT

Turning first to FIG. 1, a detailed schematic top view of an illustrative dual-service installation is depicted. In substance, the engine compartment 10 of a vehicle 11, which contains an internal combustion engine 12 such as a reciprocating or turbine engine, is equipped with a compressor-expander 14 for compressing the engine exhaust gases and, after cooling the compressed gases in an intercooler 15, for work-expanding the gases to an exhaust discharge pressure. The resulting work-expanded gases are at a sufficiently low temperature to permit a substantial portion of the pollutants to condense out as separable solids or liquids, and these are removed and discarded.

The engine 12, which may be of conventional type, discharges its exhaust gases through an exhaust gas header 16. These exhaust gases, when obtained from the combustion of liquid hydrocarbon fuels such as gasoline or diesel fuel using air as the oxidant, will contain both completely and incompletely oxidized products of combustion. The composition of such exhaust gases varies with fuel composition, fuel/air ratio, the type of engine, and the engine combustion parameters, as well as uncontrollable factors such as incoming air temperature and humidity, etc. For any given set of conditions, the gas composition at equilibrium may be calculated from data contained in, for example, Hottel et al., "Thermodynamic Charts or Combustion Processes", Parts One and Two (John Wiley & Sons, Inc., 1949).

Exhaust gases from an internal combustion engine are composed of both condensible and non-condensible compounds. The non-condensibles include nitrogen (boiling point $-320°F$), oxygen (B.P. $-297°F$), hydrogen (B.P. $-423°F$), carbon monoxide (B.P. $-310°F$), carbon dioxide (B.P. $-109°F$), nitric oxide [NO] (B.P. $-291°F$) and, to some extent, nitrogen dioxide [$NO_2$]. Condensible gases include water vapor (B.P. $+212°F$), sulfur dioxide [$SO_2$] (B.P. $+14°F$) and, importantly, unburned and partially burned (oxidized) hydrocarbons, including alkehydes, ketones, peroxides, alcohols, and the like. The gases also contain oxidation products of tetraethyl and/or tetramethyl lead, which is normally a finely divided, almost colloidal, oxide or halide.

From the standpoint of emission control, unburned and partially burned hydrocarbons, nitrogen dioxide, sulfur dioxide, and lead compounds are the particularly serious offenders. Unburned and partially burned hydrocarbons are believed to react with nitrogen dioxide under the influence of sunlight to produce the intensively irritating photochemical smog. See, in particular, Kirk and Othmer's "Encyclopedia of Chemical Technology," Second Edition, Supplement Volume, Section on 'Automobile Exhaust Control', at page 50, et. seq. Consequently, their removal is a desirable goal of all exhaust emission control systems, and is largely achieved through the system of the present invention.

Lead compounds have long been recognized as having two adverse pollution effects. First, they are potent catalyst poisons for many catalysts that have heretofore been proposed for emission control systems. And second, their introduction into the atmosphere and thereafter into human lungs may present an independent toxicity problem.

In keeing with the invention, condensible pollutants including unburned and incompletely burned hydrocarbon, tetraalkyl lead combustion products, and some of the other deleterious compounds, e.g. nitrogen dioxide, are removed from the exhaust gases by a multiple stage cooling, compression, re-cooling, and expansion system. To this end, the exhaust gases from the engine 12 are conducted from the exhaust gas header 16 through an exhaust gas manifold 18 and then to a first heat exchanger 19, where the gases are cooled by indirect heat exchange with incoming air to the engine compartment 10. The heat exchanger 19 may, as shown, be located downstream of the engine 12, and preferably also downstream of the conventional radiator 20 for the engine and an intercooler 15 for the compressor-expander 14. In any event, the heat exchanger 19 reduces the temperature of these exhaust gases from several hundred °F, to approximately, 150°F or so for subsequent processing.

After the heat exchanger 19, the exhaust gases in the manifold 18 may be conducted to an optional second heat exchanger 21 where, in the maximum thermal efficiency mode, the exhaust gases exchange heat with expanded and cooled air discharging from the vehicle through a tail pipe 22, to be described presently.

After cooling in the heat exchanger 19 and the optional exchanger 21, exhaust gases may then be sent to an optional catalytic converter 24 for catalytic oxidation of unburned and partially burned hydrocarbons to carbon oxides, and/or decomposition of nitrogen oxides to nitrogen and oxygen gases. While catalytic converters are not essential in the present system, they are advantageous from the standpoint of removing nitrogen oxides in particular, as these constituents are especially offensive from a smog-producing standpoint and are incompletely removed in the system of the invention. Catalysts such as vanadium oxides, molybdenum oxides, precious metals such as platinum and palladium, are well known; see the Kirk-Othmer reference cited above.

Figure 2:
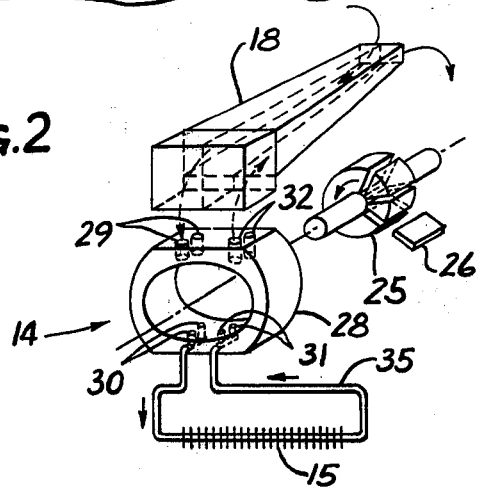
FIG. 2 an exploded perspective view of a combined or unitary rotary compressor-expander advantageously used in the system of FIG. 1.

For reasons of efficiency, economy, and simplicity, a unitary compressor-expander 14 is best employed for compression of the exhaust gases. As exemplified in U.S. Pat. No. 3,686,893 and in FIG. 2 herein, the compressor-expander 14 is of the rotary vane type, which utilizes a cylindrical rotor 25 provided with a plurality of radially-extending vanes 26, which rotates within a substantially elliptical stator 28. The term "vanes" as used herein will be understood to broadly include any partition means defining chambers which are progressively compressed in size, and enlarged, for the compressor and expander functions. The stator 28 is provided with gas inlet ports 29 from the exhaust manifold 18, with gas discharge ports 30 leading to the intercooler 15, with gas return inlet ports 31 leading back to the stator 28 elliptical cavity, and with expanded gas outlet ports 32 extending to the tail pipe 34.

As more fully explained in U.S. Pat. No. 3,686,893, the rotor 25 may be equipped with a series of slots disposed axially on the otherwise-solid rotor, and which receive axial flat-bladed vanes 26. The slots are arranged symmetrically around the circumference of the rotor; auxiliary provisions may be included for insuring close sliding contact between the outermost edges of the vanes 26 with respect to the rotor cavity 28, while end seals minimize leakage around the end faces (not shown) of the stator 28.

When the rotor 25 is rotated within the elliptical stator 28 and the vanes 26 are in sliding contact with the elliptical cavity, exhaust gases from the manifold 18 enter the cavity via the ports 29 and are compressed by the action of the vanes 26 relative to the progressively confining space between the rotor and stator. This compression is essentially adiabatic, except for incidental heat losses in the compressor-expander 14.

Compressed exhaust gases discharge from the stator 28 via the discharge ports 30 at a pressure illustratively on the order of 35 psig and at a temperature of typically about 300°F, although both the pressure and the temperature are functions of the compressor design and the inlet pressure and temperature of the exhaust gases at the manifold 18. These compressed gases must then be cooled to a temperature approaching that of the ambient atmosphere.

An additional feature of the invention resides in the fact that the compressed exhaust gases downstream of the compressor-expander and prior to the intercooler 15 are in an ideal condition for optional treatment for emission removal by reason of the higher-than-manifold pressure existing downstream of the intercooler 15. Thus, in keeping with this feature of the invention, a catalytic converter 25 (FIG. 1) is interposed in the conduit between the compressor-expander 14 and the intercooler 15 so that the compressed, heated, exhaust gases are subjected to contact with a catalytically active medium in the converter 25.

Catalysts and catalytic converters for automotive exhaust emission control have been described by others; see, for example, Kirk-Othmer's "Encyclopedia of Chemical Technology", Second Edition, Supplement Volume, Pages 62–67. Thus, where additional hydrocarbon oxidation is desired, conventional oxidation catalysts such as the vanadium oxide and/or molybdenum oxide type are preferably employed. For carbon monoxide oxidation, the supported noble metal catalysts are favored, as for example platinum or palladium on alumina. Where nitrogen oxide control is most important, the noble metal catalysts appear to be preferred. Physically, the catalysts may be disposed in any desirable configuration, e.g. radial flow converters, down flow converters, and axial flow converters.

A notable feature of catalytic converters located downstream of the compressor-expander 14 is that the exhaust gases are at a higher pressure than are the exhaust gases from similar internal combustion engines which do not utilize a compressor-expander 14 or similar device. Because the pressure existing in the converter 25 is nominally three times higher than conventional exhaust pressures, a reduced quantity of catalysts may be employed for equivalent contact times. Additionally, the higher pressure existing in the present system favors catalytic reactions of the type presently of interest.

Interstage cooling is effected in an air-cooled intercooler 15 located forwardly of the engine radiator 20 (FIG. 1). The design of this intercooler is important from the standpoint of downstream operation of the emission control system, as the more efficient the intercooler is the lower is the ultimate temperature that can be achieved, and consequently the more effective is the pollutant removal.

Be that as it may, the compressed and cooled exhaust gases leaving the intercooler 15 flow through a conduit 35 and thence to the expander section of the compressor-expander 14. Here, the gases assist in rotating the rotor 25 and thereby are reduced in pressure and cooled substantially; temperatures of −40°F are readily attained in the tail pipe 34 leaving the expander section of the compressor-expander 14.

Reducing the exhaust gas temperature to temperature below the dew point of the exhaust gas has several simultaneous effects. First, some or even most of the water vapor is condensed as either liquid water droplets or as fine snow or ice, depending on the temperature. Second, the formation of such a liquid or solid phase accumulates many of the heretofore difficulty removable pollutants, especially tetraalkyl lead decomposition products, which are otherwise too fine for removal by conventional filtration techniques; these moreover, may act as nuclei for water droplet or ice particle formation which additionally facilitates condensation of the water. Third, the formation of a low temperature liquid or solid phase, highly dispersed, assists in the accumulation of condensible unburned and partially burned hydrocarbons, which concurrently agglomerate with the water or ice. And fourth, a portion of the condensible gases, e.g. sulfur dioxide and nitrogen dioxide, along with a portion of the carbon dioxide, either condense or dissolve in the water or ice phases.

As a result of this combined cooling and condensation, many of the most troublesome pollutants are contained within a condensed liquid or solid phase, and may readily be excluded from the remaining exhaust gases.

Separation of the solid and/or liquid pollutants, including water or ice as the case may be, is effected in a separator 36 where the particles are physically removed from the gas phase. The separator 36 is advantageously a physical separator such as a cyclone or series of cyclones, a baffled chamber, a foraminous demister, or a filter, depending upon whether the condensed pollutants and water are likely to be liquids or frozen solids. This, of course, depends upon the design parameters for the compressor-expander 14, as described in U.S. Pat. No. 3,686,893. The condensed pollutants and water are then accumulated in a storage vessel 38, where they are periodically discharged.

If desired, a physical separator such as a cyclone separator 36 may be integrated with a chemical separator for further reduction of pollutants. Thus, for example, an alkaline material such as lime or soda ash may be employed to react with acidic pollutants, e.g. the nitrogen oxides and carbon dioxides, and while this adds to the operating cost of the system it may be required under especially stringent pollution control regulations.

The pollutant-denuded effluent gases leaving the separator 36 continue through the tail pipe 34. At this stage, most of the harmful pollutants have been removed, and the still-cold gases may be disposed of in any of several ways. They may, for example, merely be discharged to the atmosphere.

For optimum utilization of the low temperatures obtained in the exhaust gas, several alternative arrangements are available for optimizing either thermodynamic efficiency, or pollutant removal, or for producing refrigeration or air conditioning.

To obtain maximum thermodynamic efficiency, a valve 39 in the tail pipe 34 may be employed to direct the cold gases via a conduit 22 to the optional heat exchanger 21 located downstream of the main heat exchanger 19. Thus, the cold exhaust gases are available to chill the initial engine exhaust before the exhaust is compressed by the compressor section of the compressor-expander 14.

Alternatively, for very low emissions, the valve 39 may be employed to direct the chilled exhaust gases through a conduit 40 to a heat exchanger 41 downstream of the intercooler 15. The exchanger 41 is, in this case, connected via three-way valves 44, 45 so as to exchange with compressed and cooled gases leaving the intercooler 15, and thereby produce additional cooling of the compressed gases prior to their expansion.

In most instances, however, the user will find it more attactive to employ the chilled exhaust gases as a direct source of refrigeration or air conditioning for the vehicle or vehicle contents. To this end, the valve 39 in the tail pipe 34 is opened so as to permit all, or a substantial portion of, the chilled exhaust gases leaving the separator 36 to flow through a coolant conduit 46 and heat exchange fins 48 en route to the tail pipe 49. Fans 50 direct atmospheric air over the fins 48, which is then cooled to a temperature sufficiently low as to be suitable for air conditioning of the passenger compartment or refrigeration of a truck requiring continuous refrigeration.

Thus it is apparent that there has been provided, in accordance with the invention, a simple, practical, system for reducing or removing pollutants from engine exhaust gases. The system is especially effective in removing hydrocarbons, partialy burned hydrocarbons, and lead particles, all without requiring major engine modification or the provision of expensive, troublesome, afterburners, catalysts, or the like. Further, the system provides a chilled stream which is available for air conditioning or refrigeration, thereby obviating the cost of specific equipment used for those purposes.

I claim as may invention:

1. In an emission control system for treating the exhaust gas from an internal combustion engine of a moving vehicle, comprising, in combination:
   means for initially cooling the exhaust gas from said engine,
   means for adiabatically compressing said initially cooled exhaust gas,
   means for cooling the adiabatically compressed exhaust gas,
   and means for work-expanding said cooled adiabatically compressed exhaust gas to further cool said exhaust gas,
   the improvement wherein said adiabatically compressing means and said work-expanding means is a unitary rotary compressor-expander including a cylindrical rotor provided with a plurality of radially-extended vanes, said rotor rotating within a substantially elliptical stator having a compressor inlet port receiving said initially cooled exhaust gas, a compressor outlet port exhausting to said cooling means, an expander inlet port receiving said cooled exhaust gas, and an expander outlet port discharging said cooled exhaust gas, so that said exhaust gas is cooled to a temperature substantially below ambient to condense a substantial portion of the pollutants as a liquid or a solid phase separable from the expanded exhaust gas,
   and means for separating said separable phase containing said pollutants from the expanded exhuast gas.

2. System of claim 1 including a heat exchanger downstream of said separating means for cooling a ventilating air stream.

3. System of claim 1 including a heat exchanger downstream of said separating means for initially cooling said exhaust gases.

4. System of claim 1 including a catalytic converter downstream of said adiabatically compressing means for effecting reduction of at least one of hydrocarbon, carbon monoxide, and nitrogen oxide content of compressed exhaust gases.

* * * * *